March 27, 1945.   F. E. FREY   2,372,320
HYDROCARBON ALKYLATION PROCESS
Filed March 3, 1942
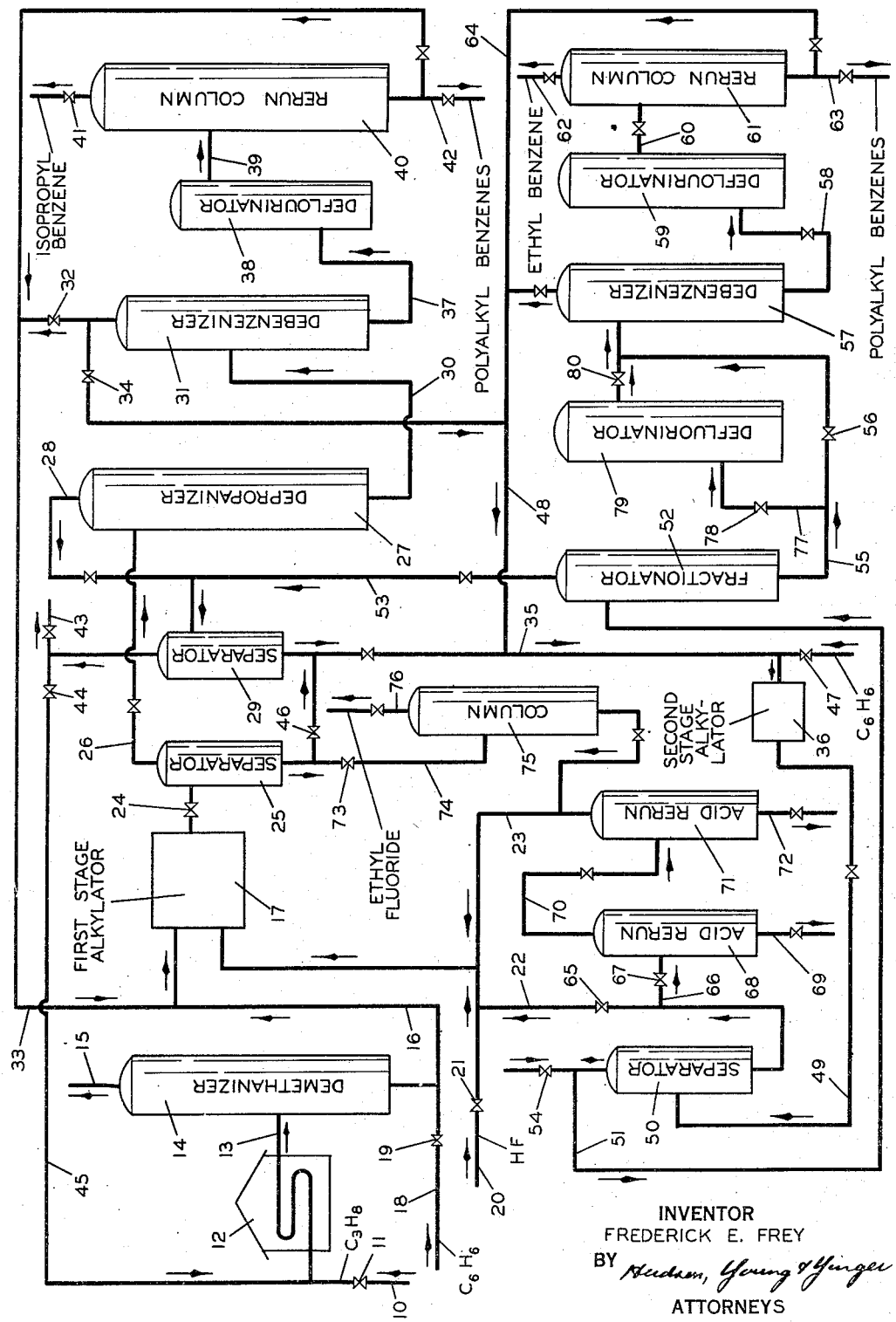
INVENTOR
FREDERICK E. FREY
BY Hudson, Young & Yinger
ATTORNEYS Patented Mar. 27, 1945

2,372,320

UNITED STATES PATENT OFFICE 2,372,320

HYDROCARBON ALKYLATION PROCESS

Frederick E. Frey, Bartlesville, Okla., assignor to Phillips Petroleum Company, a corporation of Delaware Application March 3, 1942, Serial No. 433,205

9 Claims. (Cl. 260—671)

This invention relates to a process for the catalytic alkylation of hydrocarbons. More particularly it relates to an improved process for the production of ethyl benzene by the alkylation of benzene with ethylene produced by the cracking or dehydrogenation of more saturated hydrocarbons. This application is a continuation-in-part of my copending application, Serial No. 431,571, filed February 19, 1942.

As disclosed in my copending application I have found that concentrated hydrofluoric acid is a particularly advantageous catalyst to use for reacting ethylene with benzene to form ethyl benzene as well as for reacting various derivatives of ethylene such as ethyl halides and ethyl alcohol with benzene to form ethyl benzene. It has been previously proposed to use hydrofluoric acid as a catalyst in the alkylation of benzene and also the alkylation of low-boiling isoparaffins such as isobutane by reaction with olefins such as propylene and butylene. However, I have found that sufficiently more drastic conditions are necessary to effect optimum alkylation of benzene with ethylene than to effect alkylation of benzene with higher boiling olefins so that if such higher boiling olefins are present along with the ethylene, they will be converted primarily to undesirable high-boiling hydrocarbons. This effect is true even though mixtures of propylene and butylene can be successfully used for the alkylation of benzene to produce propyl benzene and butyl benzene and polyalkyl derivatives thereof satisfactorily. Ethylene is most commonly and most economically obtained by the cracking or dehydrogenation of hydrocarbons such as by the cracking of gas-oil and the like to produce gasoline and the cracking of low-boiling paraffins particularly by the cracking and/or catalytic dehydrogenation of ethane and of ethane-propane mixtures. Ethylene so produced is generally accompanied by appreciable proportions of propylene and also sometimes of butylenes which are present as undesirable constituents when ethylene is reacted with benzene to form ethyl benzene by alkylation at somewhat elevated temperatures in the presence of hydrofluoric acid.

I have now found that olefins higher boiling than ethylene may be satisfactorily and economically removed from such mixtures by a preliminary alkylation. By such an alkylation I may react propylene and other olefins with a low-boiling isoparaffin such as isobutane to produce isoparaffins boiling in the range of motor fuel, or I may react them with benzene or other aromatic hydrocarbons to produce alkyl aromatics which may be used for motor fuel or as raw materials for various chemical processes. Such an alkylation is preferably carried out in the presence of any one of numerous catalysts known to the art and proceeds readily under conditions such that ethylene does not enter appreciably into reaction with the alkylatable hydrocarbon. Subsequent removal of higher boiling hydrocarbons produced by such alkylation is generally more readily effected than is the removal of propylene and the like from the ethylene in the original normally gaseous mixture. With some catalysts such as sulfuric acid the ethylene passes through this first alkylation step unreacted while with other catalysts such as hydrofluoric acid it is converted to a substantial extent into ethyl fluoride which serves as a suitable alkylating reactant in a subsequent alkylation step to produce ethyl benzene. Ethylene and/or ethyl fluoride is removed from effluents of this first alkylation step and is reacted with benzene to produce optimum yields of ethyl benzene in the presence of concentrated hydrofluoric acid in a subsequent alkylation step. I prefer to use hydrofluoric acid as the catalyst in both alkylation steps, and generally the operations may be appreciably simplified when this is done.

An object of this invention is to produce ethyl benzene.

A further object of this invention is to alkylate benzene with the ethylene content of refinery gases with a minimum of undesired by-products.

Still another object of my invention is to produce a variety of alkyl benzenes.

Other objects and advantages of my invention will become apparent from the accompanying disclosure and discussion.

An understanding of my invention may be aided by referring to the accompanying drawing, which is a schematic flow-diagram of one arrangement of apparatus for practicing my invention.

A normally gaseous material capable of thermal conversion to substantial proportions of ethylene and propylene is admitted through inlet 10 having valve 11 to cracking unit 12. Suitable gases are those comprising five per cent or more by volume of propane or butanes and any desired proportion of lighter gases such as ethane, ethylene, methane, nitrogen, and the like. Cracker 12 is preferably operated at or near atmospheric pressure, such as one in the range of 25 to 150 pounds per square inch absolute and at a temperature in the range of 800 to 1400° F. The optimum cracking conditions which depend upon the nature of the feed and the specific products desired, are well known to those skilled in the art of hydrocarbon conversion. The cracking conditions are adjusted to produce propylene and ethylene in relative proportions corresponding to the desired relative proportions of the products isopropyl benzene and ethyl benzene, respectively.

Cracked gases from cracker 12 pass through conduit 13 to demethanizing column 14, wherefrom methane, hydrogen, nitrogen, and the like are withdrawn through outlet 15 and the remaining $C_2$—$C_3$ fraction is passed through conduit 16 to alkylator 17. An alkylatable hydrocarbon may be admitted through inlet 18 having valve 19, and concentrated or substantially anhydrous hydrofluoric acid may be admitted through inlet 20 having valve 21 and conduits 22 and/or 23. For the purpose of illustration benzene has been chosen as the alkylatable hydrocarbon; however, in this first alkylation step, it is within the scope of this invention to alkylate also toluene or isoparaffins such as isobutane or isopentane. If toluene is used, the product is a mixture of methyl propyl benzenes, or cymenes, whereas if isobutane or isopentane is used, the product is a mixture of highly branched paraffins, mainly heptanes and octanes.

The conditions in alkylator 17 are adjusted so that propylene is consumed as alkylating reactant and ethylene is substantially unreactive as an alkylating reactant. Unreacted ethylene is generally dissolved or absorbed in the hydrofluoric acid. Using benzene as the alkylatable hydrocarbon, the temperature in alkylator 17 is preferably below 140° F., and generally should be in the range of 70 to 120° F. In the range of 70 to 140° F., the reaction of propylene with benzene is substantially completed in about 1 to 30 minutes and ethylene is extensively, and generally substantially completely, converted to ethyl fluoride which dissolves mainly in the hydrofluoric acid. At high temperatures, part of the ethylene or ethyl fluoride reacts with benzene, and at low temperatures the reaction of propylene is slow. The pressure should be sufficient to maintain most of the reaction mixture in the liquid phase and usually is in the range of about 30 to 300 pounds per square inch gage. In order to avoid side reactions such as polymerization of olefins or formation of excessive proportions of polyalkylated benzenes, benzene should be present in the reaction mixture in a substantial molal excess over the olefins. Optimum results are usually obtained using a benzene-to-olefin mole ratio in the range of about 3:1 to 10:1 or more. The proportion of concentrated hydrofluoric acid, which should be substantially anhydrous, should at least 2 times the weight of the olefin and preferably in the range of about 3 to 10 times the weight of the olefin. Alkylator 17 should be provided with means for agitating the reaction mixture to maintain intimate contacting and thorough mixing of the reactants and hydrofluoric acid.

The effluent from alkylator 17 is passed through conduit 24 to separator 25, wherein it is separated, as by cooling and gravitational or centrifugal means, into two liquid phases.

The lighter or hydrocarbon phase is passed through conduit 26 to depropanizer 27. From depropanizer 27 an overhead fraction comprising mainly propane, ethane, some ethyl fluoride, and hydrofluoric acid is passed through conduit 28 to separator 29, and the remaining material, which is mostly benzene, isopropyl benzene, and some higher boiling alkyl benzenes, is passed through conduit 30 to debenzenizing column 31.

From debenzenizer 31 an overhead fraction of benzene may be recycled through valve 32 and conduit 33 to first stage alkylator 17, or it may be passed through valve 34 and conduit 35 to second stage alkylator 36. The remaining fraction, which is mainly isopropyl benzene with some polyalkyl benzenes, is passed through conduit 37 to defluorinator 38.

Defluorinator 38 consists of a bauxite or other hydrogenation - dehydrogenation - type contact mass enclosed in a suitable vessel; it removes any small quantities of organically combined fluorine. The defluorinating temperature may be in the temperature range of 50 to 500° F. and preferably in the range 200 to 400° F.; the pressure is not critical and either gas or liquid phase conditions may be used; the space velocity may be about 1 to 6 liquid volumes of hydrocarbon per volume of catalyst per hour.

The material passes from defluorinator 38 through conduit 39 to rerun column 40, wherefrom isopropyl benzene is withdrawn overhead through outlet 41 and relatively high-boiling material, mainly polyisopropyl benzenes, may be withdrawn through valved outlet 42 or, preferably, may be recycled through conduit 33 to alkylator 17, wherein it is dealkylated to form more isopropyl benzene.

In separator 29 the overhead fraction from depropanizer 27 is separated, as by cooling, compression, and gravitational or centrifugal means, into two liquid phases. The lighter or hydrocarbon phase, which is mostly propane and ethane, may be withdrawn through valved outlet 43 or preferably, recycled through valve 44 and conduit 45 to cracker 12. The heavier or hydrofluoric acid phase, which ordinarily contains dissolved ethyl fluoride is passed through conduit 35 to second stage alkylator 36.

The heavier or acid phase from separator 25, which contains relatively large proportions of dissolved ethyl fluoride absorbed or formed in alkylator 17, is passed through valve 46 and conduit 35 to second stage alkylator 36.

In alkylator 36, benzene, which may be admitted through valved inlet 47 and recycle conduit 48, is alkylated by a solution of ethyl fluoride in concentrated hydrofluoric acid obtained from the first alkylation stage as already described. Ethylene which has passed unreacted through alkylator 17, or secured from some outside source, may also be added by means not shown. In alkylator 36, the conditions are more drastic than in alkylator 17; this is, alkylation of benzene with ethyl fluoride or ethylene, in the presence of concentrated hydrofluoride acid requires a higher temperature or a longer reaction time than alkylation with propylene. The temperature may be in the range of about 120 to 300° F. Preferably it is in the range of about 170 to 220° F. At low temperatures the reaction is slow and at high temperatures some polymerization of ethylene or ethyl fluoride occurs. The reaction time may vary from less than a minute at high temperatures to several hundred minutes at low temperatures. In the preferred temperature range time of about 2 to 20 minutes is adequate. Excessively long reaction times causes increased degeneration of the catalyst and reduces the capacity of given equipment; with excessively short reaction times, the ethylene or ethyl fluoride is not all reacted. The pressure in reactor 36 should be sufficient to maintain a substantial proportion or all of the reaction mixture in the liquid phase. The mixture should be continuously agitated to insure intimate mixing and contacting of the acid and hydrocarbon phases.

The mixture from alkylator 36 is passed through conduit 49 to separator 50, in which it is separated, as by cooling and gravitation or centrifugation, into two liquid phases.

The lighter or hydrocarbon phase from separator 50 passed through conduit 51 to fractionator 52. From fractionator 52, an overhead fraction comprising low-boiling hydrocarbons, such as propane or butane, and hydrofluoric acid is passed through conduit 53 to separator 29. If insufficient low-boiling hydrocarbons are present in the feed to fractionator 52 to efficiently remove all dissolved hydrogen fluoride as an azeotropic mixture it is usually desirable to add such hydrocarbons, as though valved inlet 54. The kettle fraction from fractionator 52 is passed through conduit 55 and valve 56 to debenzenizing column 57.

Column 57 separates the hydrocarbon mixture into an overhead fraction of benzene, which is recycled through conduits 48 and 35 to alkylator 36, and a kettle fraction consisting of ethylbenzene and relatively small proportions of polyalkyl benzenes, which is passed through conduit 58 to defluorinator 59.

From defluorinator 59, which is similar to defluorinator 38, the resulting fluorine-free mixture passes through conduit 60 to column 61. Column 61 effects a separation into substantially pure ethyl benzene and high-boiling material such as polyethyl benzenes. The ethyl benzene may be withdrawn through outlet 62. One or more polyethyl benzene fractions may be withdrawn through valved outlet 63; preferably, however, most of this material is recycled, as through conduits 64, 48 and 35 to alkylator 36, whereby, by a dealkylation reaction with benzene, or by suppressing the formation of additional polyethyl benzenes, it serves to increase the ultimate yields of ethyl benzene.

The heavier or acid phase from separator 50 may be recycled through conduit 22 having valve 65 to first-stage alkylator 17. Preferably at least part of it is passed through conduit 66 having valve 67 to acid rerun column 68. The kettle temperature of column 68 should be sufficiently high, preferably in the range of 300 to 500° F., to split out substantially all fluorine as HF from fluoro-organic compounds. A kettle fraction of a substantially fluorine-free high-boiling oil is withdrawn through outlet 69, and an overhead fraction of hydrogen fluoride, hydrocarbons, and some water is passed through conduit 70 to column 71. From column 71 an overhead fraction of anhydrous hydrofluoric acid is recycled through conduit 23 to alkylator 17, and the remaining kettle fraction comprising a mixture of hydrocarbons and a maximum boiling aqueous solution of hydrogen fluoride is withdrawn through outlet 72.

In order to recover ethyl fluoride as a byproduct, part of the solution of ethyl fluoride in hydrofluoric acid from separator 25 may be passed through valve 73 and conduit 74 to column 75. From column 75, an overhead fraction of substantially pure ethyl fluoride is withdrawn, as through outlet 76, and the kettle fraction of hydrofluoric acid may be recycled through conduit 23 to alkylator 17.

In some cases, as when the alkylate fractions contain unusually objectionable proportions of organically combined fluorine due to, for example, the use of badly spent acid as catalyst or to excessively high alkylating temperatures, several additional defluorinating steps are advantageous. For examples, the kettle fraction from fractionator 52 may be passed through conduits 55 and 77 and valve 78 to defluorinator 79, and thence through conduit 80 instead of directly through conduit 55 and valve 56, to debenzenizer 57. This is advantageous in reducing corrosion in debenzenizer 57 and in equipment for recycling the benzene. A similar additional defluorinating step may at times be advantageous also in the first alkylating stage. Since organically combined fluorine tends to concentrate in the high boiling hydrocarbon fractions it is desirable in most cases to retain the defluorinators 38 and 59 in the feed lines to rerun columns 40 and 61, respectively; this insures that the desired overhead products, isopropyl benzene and ethyl benzene respectively, from these columns will be substantially completely fluorine-free.

As previously discussed, I have found that hydrofluoric acid is a particularly advantageous catalyst to use in the production of ethyl benzene by alkylation. Hydrofluoric acid is also an excellent catalyst to use for the alkylation of benzene with other alkylating reactants, particularly propylene and butylenes, but numerous other catalysts are also effective for these alkylations which are not as effective as hydrofluoric acid in producing ethyl benzene. Such other catalysts, particularly sulfuric acid, various sulfonic acids, phosphoric acids, and others known to the art may be used in alkylator 17, alone or in admixture with hydrofluoric acid. When a low-boiling isoparaffin is used in the first alkylation step the products will be primarily isoparaffins suitable of use in aviation gasoline. However, I prefer to use hydrofluoric acid in both steps, as has been discussed.

It is to be understood, of course, that various parts, or units, of equipment have been shown diagrammatically, and that in any commercial plant there will be need to be numerous heating units for the dehydrogenators, fractionators, alkylators, etc., cooling units, surge tanks, pumps, etc., and that each fractionator, although shown as a single unit, will generally comprise two or more fractionating columns with suitable reflux equipment, separators, and the like. Any particular modification and installation will have its own particular requirement in this respect, which in any case can be readily supplied and equipped by one skilled in the art without departing from the spirit of the teachings of the present disclosure.

*Example I*

In a continuous run for alkylating benzene with propylene to produce isopropylbenzene, benzene and propylene were passed continuously into a system containing liquid concentrated hydrofluoric acid and consisting of a turbo-reactor and a gravity settling chamber. A small stream of the hydrocarbon which separated out as an upper layer in the settling chamber was continuously withdrawn and the acid or lower layer was continuously recycled to the turbo-reactor. The volume of the separator was small compared to the volume of the turbo-reactor. The temperature in the reactor was 118° F.; the pressure was 51 pounds per square inch; the total length of the run was 254 minutes, and the total quantity of hydrofluoric acid in the system was kept substantially constant by adding small quantities of fresh acid during the run to compensate for acid withdrawn in solution in the effluent. Data were taken at intervals and material balances and analyses were made for reactants and products for three periods of the run. The last determination of acid solubles was made on acid from the settler 16 minutes after the end of the run. The data are as follows:

|  | Period | | |
|---|---|---|---|
|  | 1 | 2 | 3 |
| Temperature ° F | 118 | 118 | 118 |
| Minutes in operation | 0-20 | 20-119 | 119-254 |
| Average reaction time min | 17.8 | 20.3 | 30.9 |
| *HF in system* | | | |
| Original charge lbs | 10.06 | | |
| Cumulative make-up lbs | | | 1.13 |
| Cumulative out in products lbs | | | 2.19 |
| Hydrocarbon/HF ratio, weights | 1.1 | 1.3 | 1.4 |
| Benzene/propylene ratio moles | 8.6 | 8.3 | 5.4 |
| Yield, per cent of theoretical based on propylene | 75.6 | 87.2 | 81.2 |
| *Composition of alkylate, per cent by weight* | | | |
| Isopropyl benzene | 93.9 | 93.5 | 91.0 |
| Polyisopropyl benzenes | 6.1 | 6.5 | 9.0 |
| *Acid solubles* (weight per cent of acid) | | | |
| After 83 minutes on stream | | 1.17 | |
| After 270 minutes from start of run | | | 1.24 |

From this data it is evident that benzene can be alkylated at low temperatures with propylene to give substantially quantitative yields of isopropyl and polyisopropyl benzenes. Although the total yield in this run was of the order of 80 per cent, it is known that some of the product was lost through leaks in apparatus. The polyalkyl benzenes may be recycled to the alkylator or to a separate dealkylating step whereby, in accordance with the law of mass action, they inhibit the formation of additional polyalkyl benzenes or are converted to additional isopropyl benzene. It is also evident from these data that the consumption of acid or rate of formation of acid soluble materials is low under these conditions.

*Example II*

To a 3 liter, steel reactor having a mechanical stirrer, were charged 2.0 pounds of concentrated or substantially anhydrous hydrofluoric acid and 2.3 pounds of benzene. To this mixture a total of 0.14 pound of ethylene was gradually added during a period of about 20 minutes. The average temperature was 238° F.; the pressure was 250 pounds per square inch gage, and the average reaction time was 54 minutes. The total yield of alkylated benzenes was 92 per cent by weight based on the ethylene charged. The composition of the alkylate was as follows in per cent by weight:

| | |
|---|---|
| Ethyl benzene | 84.6 |
| Di-ethyl benzene | 10.6 |
| Tri-ethyl benzene | 2.2 |
| Other poly-ethyl benzene | 2.6 |
| | 100. |

A small proportion (equivalent to about 2 mole per cent of the ethylene charged) of ethyl fluoride was found in the acid phase. Other acid soluble materials amounted to about 1.1 per cent by weight of the acid. The polyethyl benzenes may be recycled to the alkylation reaction zone to increase the yield of ethyl benzene.

*Example III*

In a run similar to that of Example II except that the temperature was 160° F., the pressure was 80 pounds per square inch, and the average reaction time was 52 minutes, the yield of total alkylate was 70.0 per cent of the theoretical yield based on the ethylene in the charge. The composition of the alkylate was 85.8 per cent benzene by weight and 14.2 per cent polyethyl benzene. About 20 per cent of the ethylene charged was recovered as ethyl fluoride from solution in the acid by diluting the acid with water. This example shows that benzene can be alkylated by ethylene in the presence of hydrofluoric acid at temperatures as low as 160° F., but that 54 minutes is not a long enough time for the reaction to be satisfactorily completed.

It is to be appreciated that various modifications of my invention may be practiced without departing from the spirit of the disclosure or scope of the claims, and that the invention should not be unduly limited by specific examples given and discussed.

What is claimed is:

1. The process of alkylation which comprises subjecting a mixture of an alkylating reactant having two carbon atoms per molecule and at least one alkylating reactant having more than two carbon atoms per molecule in a first alkylating zone to reaction with an alkylatable hydrocarbon in the presence of liquid concentrated hydrofluoric acid as a catalyst under conditions of temperature and time adjusted to effect alkylation of the alkylatable hydrocarbon with the alkylating reactant having more than two carbon atoms per molecule and to effect solution of the alkylating reactant having two carbon atoms per molecule in the liquid hydrofluoric acid, separating from effluents of said first alkylating zone a liquid hydrofluoric acid phase containing dissolved alkylating reactant, and contacting said liquid acid phase in a second alkylating zone with benzene under conditions of temperature and time adjusted to effect alkylation of benzene with the dissolved two-carbon alkylating reactant to form ethyl benzene.

2. The process which comprises subjecting a normally gaseous hydrocarbon mixture which contains at least 5 per cent by volume of propane to cracking conditions to produce ethylene and at least one olefin having more than two carbon atoms per molecule, subjecting said olefins in the presence of hydrofluoric acid as a catalyst to reaction in a first alkylating zone with an alkylatable hydrocarbon under conditions such as to consume olefins having more than two carbon atoms per molecule by alkylation, and to form ethyl fluoride, and subjecting at least part of said ethyl fluoride formed in the first alkylating zone to reaction with benzene in a second alkylating zone under conditions to produce ethyl benzene.

3. An improved process for producing ethyl benzene from ethylene which is associated with an olefin of more than two carbon atoms per molecule, which comprises subjecting an olefin-containing mixture comprising ethylene and an olefin of more than two carbon atoms per molecule to reaction in a first alkylating zone with an alkylatable hydrocarbon in the presence of hydrofluoric acid as a catalyst under conditions such as to consume olefins having more than two carbon atoms per molecule by alkylation, and to form ethyl fluoride, and subjecting at least part of said ethyl fluoride formed in the first alkylating zone to reaction with benzene in a second alkylating zone under conditions such as to produce ethyl benzene.

4. The process of claim 3 wherein said alkylatable hyrocarbon is benzene.

5. An improved process for reacting ethylene which is associated with an olefin of more than two carbon atoms per molecule, which comprises subjecting an olefin-containing mixture comprising ethylene and an olefin of more than two carbon atoms per molecule to reaction in a first alkylating zone with an alkylatable hydrocarbon in the presence of hydrofluoric acid as a catalyst under conditions such as to consume olefins having more than two carbon atoms per molecule by alkylation, and to form ethyl fluoride, and subjecting at least part of said ethyl fluoride formed in said first alkylating zone to reaction with an alkylatable hydrocarbon in a second alkylating zone under conditions to react said ethyl fluoride with said alkylatable hydrocarbon to produce an ethyl derivative thereof.

6. An improved process for effecting conversion of ethylene which is associated with an olefin of more than two carbon atoms per molecule, which comprises subjecting an olefin-containing mixture comprising ethylene and an olefin of more than two carbon atoms per molecule to reaction in a first alkylating zone with an alkylatable hydrocarbon in the presence of liquid hydrofluoric acid as a catalyst under conditions such as to consume olefins having more than two carbon atoms per molecule by alkylation, and to form ethyl fluoride which dissolves in said liquid hydrofluoric acid, separating from effluents of said first alkylating zone a liquid hydrofluoric acid phase containing dissolved ethyl fluoride, passing said hydrofluoric acid phase to a second alkylating zone and contacting same with an alkylatable hydrocarbon under conditions to react said ethyl fluoride with said alkylatable hydrocarbon to produce an alkyl derivative thereof.

7. A process for producing ethylbenzene and propyl benzene from an olefin-containing mixture comprising ethylene and propylene, which comprises subjecting such an olefin-containing mixture to reaction in a first alkylation zone with benzene in the presence of a concentrated liquid hydrofluoric acid catalyst under conditions such that propylene reacts with benzene to form propyl benzene and also such that ethylene does not take part in alkylation reactions, separating effluents of said first alkylation zone into a hydrocarbon phase and a liquid hydrofluoric acid phase, from said hydrocarbon phase separating a fraction comprising propyl benzene as a product of the process, passing ethylene from effluents of said first alkylation zone together with at least a portion of said liquid hydrofluoric acid phase to a second alkylation zone and contacting same therein with benzene under alkylation conditions such as to form ethyl benzene and more drastic than alkylation conditions in said first alkylation zone, separating effluents of said second alkylation zone into a hydrocarbon phase and a liquid hydrofluoric acid phase, from said hydrocarbon phase separating a fraction comprising ethyl benzene as a product of the process, subjecting the last said liquid hydrofluoric acid phase to fractional distillation to recover substantially anhydrous hydrofluoric acid, and passing said anhydrous hydrofluoric acid to said first alkylation zone.

8. A process for producing ethyl benzene and propyl benzene from an olefin-containing mixture comprising ethylene and propylene, which comprises subjecting such an olefin-containing mixture to reaction in a first alkylation zone with benzene in the presence of a concentrated liquid hydrofluoric acid catalyst under conditions such that propylene reacts with benzene to form propyl benzene and also such that ethylene does not take part in alkylation reactions, from effluents of said first alkylation zone separating a hydrocarbon fraction comprising propyl benzene so produced as a product of the process, passing ethylene and liquid hydrofluoric acid from effluents of said first alkylation zone to a second alkylation zone and contacting same therein with benzene under alkylation conditions such as to form ethyl benzene and more drastic than alkylation conditions in said first alkylation zone, and from effluents of said second alkylation zone recovering a hydrocarbon fraction comprising ethyl benzene so produced as a product of the process.

9. A process for reacting alkylatable hydrocarbons with ethylene and propylene from an olefin-containing mixture comprising ethylene and propylene, which comprises subjecting such an olefin-containing mixture to reaction in a first reaction zone with an alkylatable hydrocarbon in the presence of a concentrated liquid hydrofluoric acid catalyst under conditions such that propylene reacts with said alkylatable hydrocarbon to form alkyl derivatives thereof and also such that ethylene does not take part in alkylation reactions, separating effluents of said first alkylation zone into a hydrocarbon phase and a liquid hydrofluoric acid phase, from said hydrocarbon phase separating a fraction comprising alkylated hydrocarbons so produced as a product of the process, passing ethylene from effluents of said first alkylation zone together with at least a portion of said liquid hydrofluoric acid phase to a second alkylation step and contacting same therein with an alkylatable hydrocarbon under alkylation conditions such as to form ethyl derivatives of said alkylatable hydrocarbon and more drastic than alkylation conditions in said first alkylation zone, separating effluents of said second alkylation zone into a hydrocarbon phase and a liquid hydrofluoric acid phase, from said hydrocarbon phase separating a fraction comprising alkyl hydrocarbons so produced as a product of the process, subjecting the last said liquid hydrofluoric acid phase to fractional distillation to recover substantially anhydrous hydrofluoric acid, and passing said anhydrous hydrofluoric acid to said first alkylation zone.

FREDERICK E. FREY.